United States Patent [19]

Ramsey et al.

[11] Patent Number: 4,789,332

[45] Date of Patent: Dec. 6, 1988

[54] APPARATUS FOR REMOVING VOLATILES FROM METAL

[75] Inventors: Everett M. Ramsey, Richland; Bruce A. Gray; Donald C. Evans, both of Newburgh, all of Ind.

[73] Assignee: Aluminum Company of America, Pittsburgh, Pa.

[21] Appl. No.: 107,201

[22] Filed: Oct. 13, 1987

Related U.S. Application Data

[60] Division of Ser. No. 879,066, Jun. 26, 1986, Pat. No. 4,715,810, which is a continuation-in-part of Ser. No. 750,336, Jun. 28, 1985, abandoned.

[51] Int. Cl.⁴ .............................. F27B 9/28; F26B 5/00
[52] U.S. Cl. ....................................... 432/59; 432/72; 110/228; 110/222; 110/236; 110/281
[58] Field of Search ............... 432/8, 72, 59; 110/224, 110/228, 278, 281, 283, 203–205, 210, 211, 222; 34/35, 86, 72; 266/156, 901; 75/445

[56] References Cited

U.S. PATENT DOCUMENTS

| | | | |
|---|---|---|---|
| 945,469 | 1/1910 | Mapel | 110/281 |
| 2,750,680 | 6/1956 | Houdry et al. | 34/35 |
| 2,795,054 | 6/1957 | Bowen, III | 34/35 |
| 2,932,264 | 4/1960 | Hurst | 110/282 |
| 3,005,699 | 10/1961 | Erck et al. | 266/156 |
| 3,604,824 | 9/1971 | Haridson | 432/72 |
| 3,623,235 | 11/1971 | Smith, Jr. | 34/86 |
| 3,627,289 | 12/1971 | Erman | 110/236 |
| 3,670,669 | 6/1972 | Hoad | 110/226 |
| 3,787,171 | 1/1974 | Cromp | 432/72 |
| 3,917,444 | 11/1975 | Carthew | 432/72 |
| 4,021,192 | 5/1977 | Ferguson et al. | 432/72 |
| 4,098,007 | 7/1978 | Davis et al. | 34/72 |
| 4,098,200 | 7/1978 | Dauvergne | 110/228 |
| 4,121,524 | 10/1978 | Voelskow et al. | 110/222 |
| 4,167,909 | 9/1979 | Dauvergne | 110/228 |
| 4,217,090 | 8/1980 | Whike et al. | 432/59 |
| 4,326,342 | 4/1982 | Schregenberger | 432/72 |
| 4,331,086 | 5/1982 | Fitch et al. | 432/72 |
| 4,389,978 | 6/1983 | Northcote | 110/283 |
| 4,418,816 | 12/1983 | Kropp | 110/281 |
| 4,510,873 | 4/1985 | Shigaki | 110/282 |
| 4,563,959 | 1/1986 | Fujiwara | 110/281 |

Primary Examiner—Henry C. Yuen
Attorney, Agent, or Firm—David W. Brownlee; Thomas J. Connelly

[57] ABSTRACT

A process and apparatus for removing volatile contaminants from scrap metal is disclosed. The process is carried out in a furnace maintained at a relatively constant temperature and having a first zone in which volatiles contained on the surface of the metal are vaporized and a second zone in which carbon contained on the surface of the metal is pyrolyzed. The furnace also has a conveyor for transporting metal therethrough at a specific speed to ensure complete vaporization and pyrolysis of the contaminants. The process includes the steps of sufficiently vaporizing the volatiles without oxidizing the metal, the vaporizing producing fumes containing unburned hydrocarbons. The hydrocarbon fumes are then burned to produce hot gas which is recirculated to the furnace. The hot gas contacts the incoming metal and vaporizes the volatiles contained thereon.

10 Claims, 3 Drawing Sheets

APPARATUS FOR REMOVING VOLATILES FROM METAL

CROSS-REFERENCE TO RELATED APPLICATION

This application is a division of application Ser. No. 879,066, filed June 26, 1986, now U.S. Pat. No. 4,715,810 which is a continuation-in-part of Ser. No. 750,336, filed June 28, 1985, now abandoned.

FIELD OF THE INVENTION

This invention relates to a process and apparatus for removing volatiles from metal and more particularly to a process and apparatus for delacquering scrap aluminum cans.

BACKGROUND OF THE INVENTION

In order to enhance the recovery of scrap metal contaminated with combustible hydrocarbons, it is desirable to remove the contaminants prior to melting the scrap metal. It has been recognized that organic contaminants such as paint and lacquer, which are presently coated onto aluminum beverage cans, have heat content which can be recovered to heat incoming material. Currently the use of the heat content of hydrocarbon contaminants has been used in drying and oxidizing methods. Three prior art patents which teach the usefulness of preheating with burned hydrocarbons are U.S. Pat. Nos. 2,795,054; 3,005,699; and 3,623,235. In addition, a method of using vaporized fumes to preheat material in a rotary kiln is taught in U.S. Pat. No. 4,548,651 and in U.S. application Ser. No. 750,337, entitled "Scrap Metal System", which was filed June 28, 1985 and allowed Feb. 26, 1986. This patent application is assigned to Aluminum Company of America. While many of the above-described methods work as intended, there is still a need for a process and an apparatus which are highly efficient, relatively pollution-free, easily operated, and capable of handling large quantities of scrap metal.

Now such a process and apparatus have been invented which can more efficiently handle large quantities of scrap aluminum cans containing a lacquer or paint coating thereon.

SUMMARY OF THE INVENTION

Briefly, the present invention relates to a process for removing volatilizable contaminants from the surface of scrap metal such as aluminum and using the heat content of the vapor in the reclamation process. The process includes heating the scrap metal to a temperature sufficient to vaporize the volatiles without oxidizing the metal. The vaporizing produces fumes which contain unburned hydrocarbons. The unburned hydrocarbons are then directed to a burner and are incinerated to produce a hot gas. This hot gas is recirculated to the furnace to heat the incoming scrap metal and vaporize the volatile contaminants contained thereon.

The reclaiming apparatus which is capable of removing volatiles from the surface of metal includes a furnace which is maintained at a relatively constant temperature. The furnace includes a first zone in which the volatiles are vaporized and a second zone in which any remaining carbon contained on the surface of the metal is pyrolyzed. The apparatus also includes means for transporting the metal through the furnace at a specific speed to ensure complete vaporization of the volatiles and pyrolysis of the carbon to occur.

The general object of this invention is to provide a process and apparatus for removing volatile contaminants from the surface of metal. A more specific object of this invention is to provide a process and apparatus for delacquering scrap aluminum beverage cans.

Another object of this invention is to provide an efficient and cost effective process for removing organic contaminants from the surface of scrap aluminum beverage cans.

Still another object of this invention is to provide a process for removing volatile contaminants from scrap aluminum cans which has marked improvements in fuel savings, handling capacity and pollution control.

Still further, an object of this invention is to provide an apparatus which can handle large quantities of scrap aluminum cans and uses the heat of incineration of the burned hydrocarbon contaminants to supply hot gas to heat incoming scrap aluminum particles.

Other objects and advantages of the present invention will become more apparent to those skilled in the art in view of the following description and the accompanying drawings.

DETAILED DESCRIPTION OF THE PREFERRED EMBODIMENTS

Figure 1:
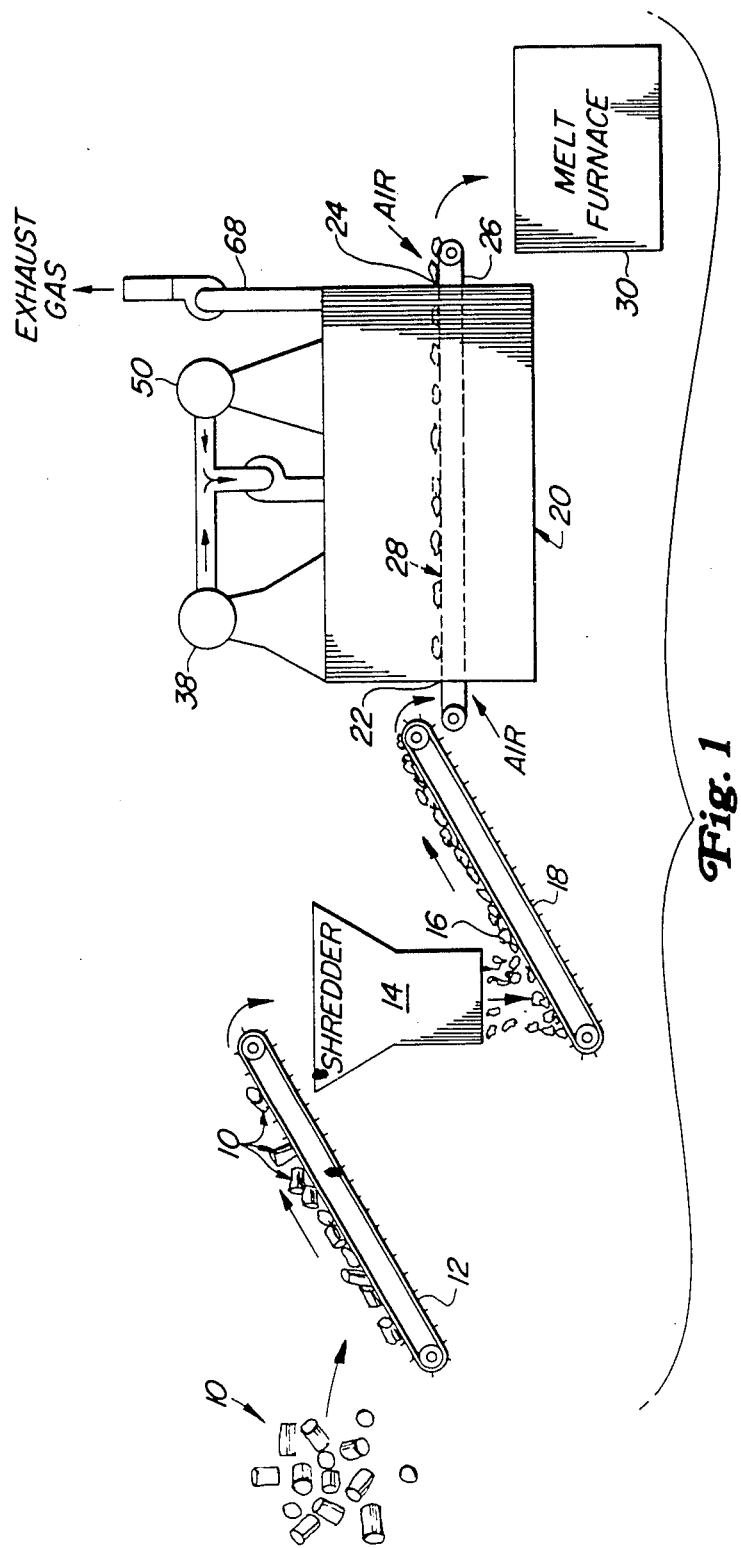
FIG. 1 is a schematic flow diagram illustrating a continuous process for removing volatiles from scrap aluminum beverage cans.

Referring to FIG. 1, scrap metal 10, such as scrap aluminum beverage cans, which has volatilizable and pyrolyzable contaminants on its surface, for example, light oil, water base paint or lacquer, is shown. The contaminants must be removed before the metal can be reclaimed. For aluminum beverage cans in particular the inside and outside surfaces are coated with a lacquer so as to protect the product which is contained in the can and also to permit the can to have printing placed upon it. These coatings are volatiles and will vaporize between 750° and 1200° F. and are capable of being burned above 1200° F. Any carbon residue remaining on the aluminum cans after the volatiles are vaporized can be pyrolyzed, that is, they can be chemically changed by the action of heat, to carbon monoxide or carbon dioxide. The scrap metal 10 is conveyed by a conveyor 12 or otherwise fed into a shredder 14. The shredder 14 shreds or crushes the scrap metal 10 into small pieces. The metal 10 will be reduced to a size of less than eight inches in length, preferably less than six inches in length, and more preferably between one-half and three inches in length. The scrap particles should have a bulk density of between 5 and 15 lbs. per cubic foot, preferably between 10 and 12 lbs. per cubic foot, and more preferably between 5 and 6 lbs. per cubic foot. When scrap aluminum beverage cans are being recycled, it is beneficial to reduce the metal into small sizes, less than six inches in length, in order to facilitate removal of the coating from their inside and outside surfaces. It should be noted that, although the shredder 14 is depicted, other type of equipment which will reduce the size of the metal can be used, for example a crusher, a hammer mill, etc. Reduced metal particles 16 exiting the shredder 14 are transported by a conveyor 18 to the entrance of a furnace 20. The furnace 20 contains an inlet 22 and an outlet 24 and has a continuous conveyor 26 for moving the metal particles 16 from the inlet 22 to the outlet 24. The conveyor 26 contains a perforated surface 28 so as to permit hot gas to pass therethrough and come in contact with the scrap metal 10. The conveyor 26 is preferably constructed of stainless steel and takes the shape of rectangular baskets which are connected together to form the conveyor. Upon leaving the furnace 20, the metal particles 16 can be routed to a melt furnace 30 where they are combined with virgin metal to form new ingot. If the metal particles 16 are of a particular alloy which does not have to be blended, they could be melted down to form blocks or ingots of that particular alloy.

Figure 2:
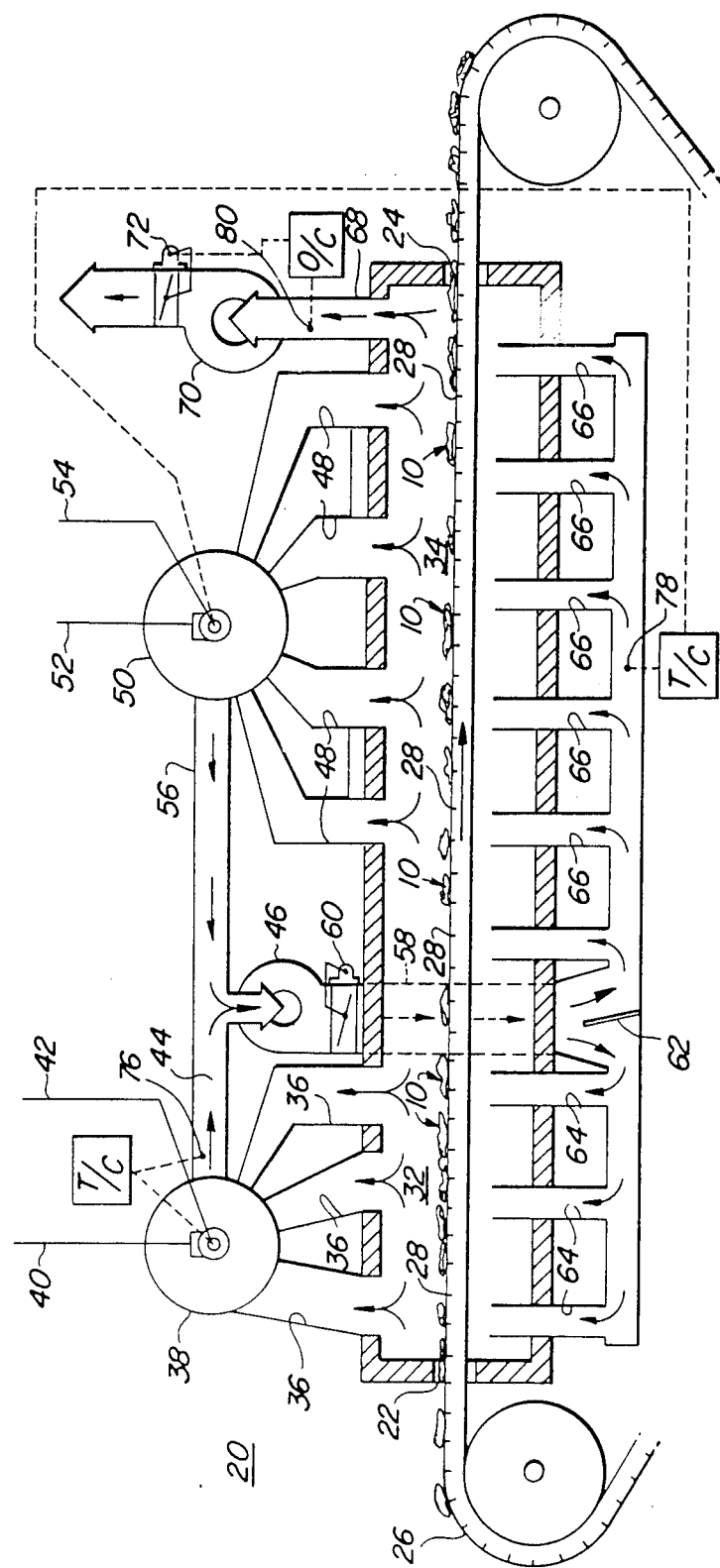
FIG. 2 is a schematic drawing of a furnace having a first zone wherein the volatile contaminants contained on the surface of a metal are vaporized and burned and a second zone showing pyrolysis of carbon contained on the metal and the recirculation of hot gas from the burner through the furnace so as to preheat incoming metal.

Referring to FIG. 2, the furnace 20 is shown having a first zone 32 and a second zone 34. The first zone 32 is located upstream of the second zone and is at a location where the volatile contaminants are vaporized into fumes containing at least some partially unburned hydrocarbons. The fumes become entrained in the hot gas which is penetrating up through the scrap metal 10 and is conveyed through one or more conduits 36 to a burner 38. Operation of the first zone 32 at a high temperature will cause the vapors to rise quickly. The burner 38 is supplied with combustion air and fuel through supply lines 40 and 42, respectively. The fuel to the burner 38 is preferably natural gas but it can also be coal, oil or any other type of known fuel. The burner 38 operates at between 1000° and 1500° F., preferably between 1200° and 1500° F., and is capable of incinerating the fumes to provide hot gas which is free of unwanted hydrocarbons. Heavy oils contained in the fumes may not burn but the content of the fumes in the recirculating gas should be low, for example less than 1%. The hot gas exiting the burner 38 is directed through a conduit 44 to a fan 46.

Figure 3:
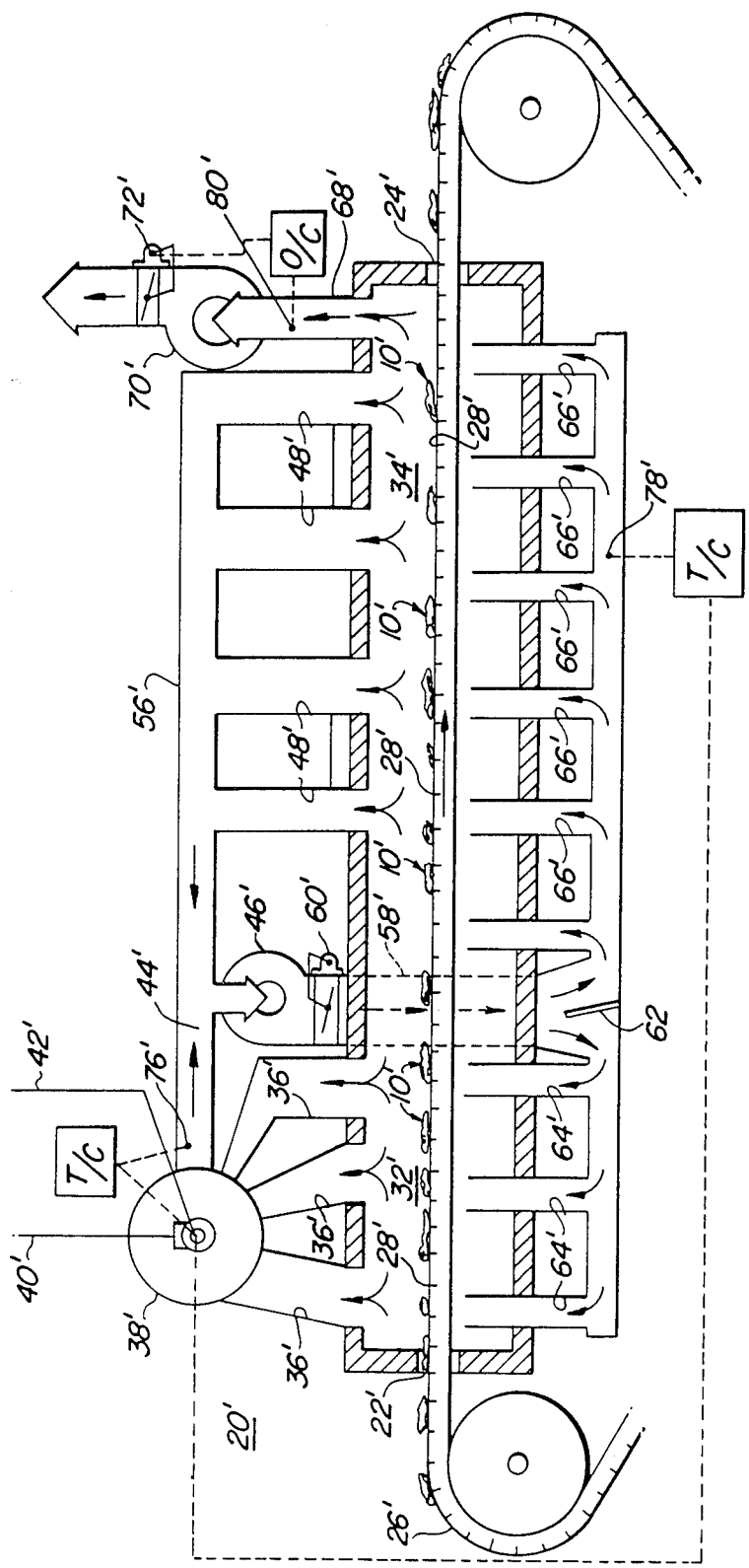
FIG. 3 is a schematic drawing of a furnace similar to that shown in FIG. 2 except that the second burner has been eliminated.

The second zone 34 of the furnace 20 is a pyrolyzing zone and is designed to pyrolyze any carbon residue contained on the scrap metal 10. Hot circulating gas, which passes through the conveyor 26 and contacts the metal 10, is routed through one or more conduits 48 to a second burner 50. The second or auxiliary burner 50 is also supplied with combustion air and fuel, preferably natural gas, through supply lines 52 and 54, respectively. Since the hot gas from the second zone 34 does not contain any unburned hydrocarbons which have to be incinerated, the burner 50 can operate intermittently when needed so as to warm the gas to a desired temperature. Depending upon the temperature of the furnace 20, for some delacquering operations it may not be necessary to employ the second burner 50 at all. FIG. 3 represents a schematic of a furnace 20' wherein the second burner has been eliminated. Preferably, the temperature of the hot gases exiting the second burner 50 is in the range of 900° to 1100° F., and more preferably about 950° F.

Returning to FIG. 2, the hot gas from the second burner 50 is directed through a conduit 56 which joins with the conduit 44 and directs the gas into the fan 46.

For a typical delacquering operation on scrap aluminum beverage cans, the temperature of the gas exiting the first burner 38 is approximately 1200° F., and this is combined with the hot gas from the second burner 50 having a temperature of approximately 950° F. The two gas streams are mixed at the fan 46 into a recirculating gas stream which is directed through a conduit 58 to the bottom of the furnace 20. At least 40% of the recirculating gas stream will come from the first burner 38. This recirculating gas stream preferably has a temperature of between 900° and 1100° F., and more preferably has a temperature of between 950° and 1050° F. The rate at which the recirculating gas stream is directed to the bottom of the furnace 20 is regulated by a control damper 60 which is attached to the outlet of the fan 46. The recirculating gas stream can also be divided between the first and second zone 32 and 34, respectively, by a control damper 62. The control dampers 60 and 62 can be manually or automatically operated as is well known to those skilled in the art. During normal operations it is preferable to divide the recirculating gas stream so that it will flow throughout the entire furnace 20.

The hot recirculating gas stream, which has a velocity of about 20,000 feet per minute, is directed through a plurality of conduits 64 to the first zone 32 and through a plurality of conduits 66 to the second zone 34. The high velocity of the recirculating air eliminates dead spots within the furnace which can cause burning on the conveyor. The distribution of the recirculating gas stream should be such that the entire inner chamber of the furnace 20 will be held at a constant temperature throughout the process. Preferably the temperature below the bottom surface of the conveyor 18 will be about 1000° F. The recirculating gas stream is mixed with sufficient oxygen which is introduced with fresh air entering the inlet 22 and the outlet 24 to heat the incoming metal and vaporize the volatiles contained thereon. As the hot gases pass through the perforated surface 28 of conveyor 18 and contact the surface of the scrap metal particles 10, some of the heat will be absorbed by the metal and the temperature of the gas stream will drop to approximately 950° F. It should also be noted that the furnace 20 should be operated at a negative pressure so that make-up air can be drawn into the furnace 20 through the inlet and outlet openings 22 and 24, respectively, as needed. The negative pressure within the furnace 20 as measured above the conveyor 18 is a −0.05 inch of water column. Operating the furnace 20 at a negative pressure will also decrease the emanation of dust from the furnace 20 to the surrounding work zone.

Referring to the right hand portion of FIG. 2, it can be seen that a certain portion of the gas rising from the second or pyrolyzing zone 34 is exhausted through an exhaust stack 68 to the atmosphere. The exhaust stack 68 is preferably located near the outlet 24 of the furnace 20 and preferably at the end of the second zone 34. It has been found that the gas rising from the scrap metal 10 at the right hand end of the second zone 34 contains such a low fume content that no further incineration is necessary. The ability to exhaust clean gas to the atmosphere without further incineration will significantly reduce fuel costs and increase the efficiency of the furnace 20. The exhaust stack 68 can be provided with an exhaust fan 70 and a control damper 72 so that one can control the rate at which the exhaust gas is exhausted from the furnace 20. By controlling the rate at which the exhaust gas leaves the furnace 20, one can control and maintain the negative pressure within the furnace 20 and thereby prevent fumes from leaking out through the various openings during operation. In addition, by regulating the rate at which the gas is exhausted from the furnace 20 with the control damper 72, one can control the level of oxygen in the recirculating gas stream. This will be described in more detail below.

An important aspect of the present invention is directed to the precise control of the temperature and oxygen content in the recirculating gas. Without such control, proper vaporization and pyrolysis cannot take place. For example, if oxidation is allowed to take place, a portion of the scrap metal 10 will be consumed and this reduces the recovery rate. Similarly, if the temperature and oxygen content are too low, vaporization and pyrolysis will not take place and the exiting metal will still contain a partial coating of lacquer or paint which will contaminate finished alloy products should it be subsequently directed to a melt furnace. When delacquering scrap aluminum beverage cans, it has been found that four critical features need to be maintained. First, the exposed surface area of the scrap aluminum particles should be maintained within a predetermined size range, preferably less than 6 inches in length and smaller in width and thickness. Second, the temperature as well as the gaseous atmosphere around the scrap aluminum should be maintained at between 750° and 1100° F., preferably between 900° and 1000° F. Thirdly, the recirculating gas stream should contain an oxygen content of between 8 and 12% and more preferably about 10%. Lastly, the retention time within the furnace itself must be sufficient to allow complete vaporization of the volatile contaminants. The retention time has been found to be inversely proportional to the temperature within the furnace 20. For scrap aluminum beverage cans, complete vaporization will occur if the aluminum particles are carried on a perforated conveyor moving at about 7½ feet per minute over a length of at least 30 feet. The above four criteria are interrelated and will vary somewhat relative to each other. Also, the chemical composition of the contaminant itself, the type of metal on which the contaminant is adhered, the presence of heavy or light oils in addition to the contaminants, etc. will cause the temperature, time and oxygen content at which complete vaporization can take place to vary. It should also be noted that in prior art processes it was customary to use a low temperature and a high oxygen content at the front end of the furnace so as to vaporize the volatiles. This invariably caused a fire within the furnace. The elimination of a flame on the conveyor 18 eliminates the possibility of explosion and eliminates bed fires since the oxygen content is lower and the recirculation rate is higher. With this inventive process, the vaporization takes place in a flameless environment and the incineration of the unburned hydrocarbon fumes takes place in the first burner 38. When delacquering scrap aluminum beverage cans, it is detrimental to have burning take place on the conveyor 18 for this tends to oxidize the scrap metal 10 and can cause a temperature imbalance within the furnace 20. Also, as stated above, any oxidation of the scrap metal 10 will reduce the recoverable metal which is to be recycled.

In the illustrated embodiment, it has been found that the temperature of the recirculating gas stream can be maintained around 950° F. by mixing the cooler gas from the second zone 34 with the hot gas from the first burner 38. This is possible when the temperature of the hot gas from the first burner 38 is maintained around 1200° F. and the second burner 50 is regulated to keep the temperature of the gas exiting the second zone 34 between 900° and 1000° F. The temperature of the hot gas is maintained around 1200° F. by regulating the firing rate of the first burner 38. Typically, if a large volume of fumes are generated in the vaporizing zone 32 and are drawn into the first burner 38, the temperature of the hot gases exiting the first burner 38 will rise. This is because the heat content of the excess fumes is released to the hot gas as the fumes are burned. This temperature rise will be sensed by a temperature sensing device 76 positioned in the conduit 44 just downstream of the first burner 38. The temperature sensing device 76 provides input to the first burner 38 which acts accordingly to adjust the supply of air and fuel, thereby decreasing or increasing the total amount of fuel consumed by the first burner 38. This adjustment is made to maintain the temperature of the exiting hot gas around 1200° F. This 1200° F. gas is then mixed with the cooler gas from the pyrolyzing zone 34 and recirculated throughout the furnace 20. The temperature of the recirculating gas is measured by a second temperature sensing device 78 which is positioned in one of the conduits 66. Preferably the temperature sensing device 78 should be located at the bottom of the furnace 20 below the pyrolyzing zone 34. The temperature sensing device 78 provides input to the second burner 50 which acts accordingly to vary its firing rate to maintain the temperature of its exiting gas at between 900° and 1000° F. It should be noted that while the temperature sensing device 78 has been shown located at the bottom of the pyrolyzing zone 34, it could also be located almost anywhere within either the vaporizing zone 32 or in the pyrolyzing zone 34.

As previously mentioned, effective vaporization and pyrolysis of the volatile contaminants requires that the oxygen content be maintained below 14%, preferably between 8 and 12%. The desired oxygen content in the furnace 20 is maintained by controlling the influx of air to the furnace 20 by regulating the exhaust out of the furnace 20. Control of the oxygen content is provided by locating an oxygen sensing device 80 in the exhaust stack 68. The oxygen sensing device 80 should be capable of providing input to the exhaust control damper 72. Thus if an increase in the oxygen content is sensed within the exhaust stack 68, the control damper 72 will automatically throttle back, thereby decreasing the rate at which the fresh outside or ambient air is drawn into the furnace 20. Similarly, if a decrease in the oxygen content is sensed, the exhaust control damper 72 will be opened to increase the flow of outside air into the furnace 20. While the oxygen sensing device 80 is shown located in the exhaust stack 68, it could also be located in the furnace 20 at a position where the oxygen content of the recirculating gas can be sensed. It has been found that under normal operating conditions about 20% of the gas is exhausted to the atmosphere and once the exhaust control damper 72 is initially set to a desired oxygen level it will not have to be adjusted.

Referring to FIG. 3, the numbers shown thereon correspond to those used in FIG. 2 except that they are prime numbers. FIG. 3 shows an alternative arrangement wherein the second burner 50 has been eliminated. When the second burner is eliminated, the recirculating gas stream should be maintained at a minimum of 1000° F. In the furnace 20, two temperature sensing devices 76' and 78' are still employed but the inputs from both devices 76' and 78' are directed to the burner 38'. With this arrangement, the temperature of the hot gas exiting the burner 38' is allowed to float, for example between approximately 1200° and 1500° F., while the temperature of the recirculating gas stream is maintained at a relatively constant temperature, for example around 950° F. Thus, the firing rate of the burner 38' will be increased or decreased in response to changes detected in the temperature of the recirculating gas stream by the temperature sensing device 78'. The only constraint on this system is that the temperature of the hot gas leaving the burner 38' would not be permitted to drop below a first predetermined value nor rise above a second predetermined value. In our example, if the optimum temperature range of the furnace is between 1200° and 1500° F., then a drop in temperature below 1200° F. should be avoided since the burner 38' would not provide adequate fuel incineration and a rise in temperature above 1500° F. should likewise be avoided to prevent possible damage to the furnace 20'. Also, any excessive rise in temperature within the furnace 20' should be avoided for it could possibly cause oxidation or burning of the scrap metal on the conveyor. If the temperature of the hot gas exiting the burner 38' were to exceed the maximum 1500° F. value, the supply of air and fuel through the supply lines 40' and 42', respectively, would be shut off. Although the maximum value would be exceeded only in extreme situations, such as where excessive volumes of fumes were generated, the temperature sensing device 76' is needed for safety precautions. If the temperature of the hot gas exiting the burner 38' were to fall below the minimum 1200° F. value, the supply of air and fuel through the supply lines 40' and 42', respectively, would be increased.

The present apparatus and method are capable of improving the fuel savings, handling capacity and pollution control of a delacquering furnace, especially one designed to delacquer scrap aluminum beverage cans. Since installing this particular apparatus, the particulate emission and opacity at applicants' plant were substantially reduced. In fact, the State Board of Health permitted the furnace to increase its operating rate from 12,500 lbs. of aluminum scrap per hour to 30,000 lbs. of scrap per hour. The 30,000 lb. per hour figure is the maximum rate of capacity for the furnace. In addition, the fuel consumption of the furnace decreased from 2000 Btu's per pound of aluminum scrap treated at 12,500 lb. per hour operating range to approximately 500 Btu's per pound of aluminum scrap treated at the operating rate of about 22,000 lb. per hour. This substantial decrease in fuel consumption is tremendous and equates to a substantial reduction in air pollution and a more efficient operating rate.

While the invention has been described in conjunction with two specific embodiments, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. Apparatus for removing volatiles from the surface of metal, comprising:
    a furnace having a first zone for heating metal to vaporize most of the volatiles from the metal and a second zone for further heating the metal to remove additional material from the metal;
    a conveyor for moving metal sequentially through said first zone and then through said second zone;
    a burner adapted to receive vapors containing volatiles from said first zone and burning them to produce hot gas;
    a fan adapted to receive said hot gas from said burner and cooler gas from said second zone to provide a recirculating gas stream;
    means for distributing said recirculating gas stream to said first and second zones for contacting metal as it is moved through said zones;
    means for controlling the temperature in the furnace in relation to the speed and mass of the metal moved through the furnace to sufficiently vaporize the volatiles on metal moved through the furnace while sufficiently minimizing oxidation of the metal.

2. Apparatus as set forth in claim 1 which includes a second burner adapted for burning at least a portion of the vapors from said second zone before the vapors are received by said fan.

3. Apparatus as set forth in claim 1 in which said conveyor has a perforated floor for supporting metal carried by the conveyor so said recirculated gases can flow upwardly through the metal.

4. Apparatus as set forth in claim 1 which includes means for shredding metal into small pieces to be fed into said furnace.

5. Apparatus as set forth in claim 1 which includes a gas exhaust outlet near the downstream end of said second zone.

6. Apparatus as set forth in claim 5 which includes means for sensing and controlling the oxygen content of gas in the furnace.

7. Apparatus as set forth in claim 1 which includes temperature sensing means under said conveyor.

8. Apparatus as set forth in claim 1 which is adapted to be operated at less than atmospheric pressure inside the furnace.

9. Apparatus for removing volatiles from the surface of scrap aluminum, comprising:
    means for shredding scrap aluminum into pieces less than eight inches in length;
    a furnace adapted to be maintained at a relatively constant temperature and having a first zone for vaporizing volatiles on shredded aluminum and a second zone for pyrolyzing carbon on the aluminum;
    a conveyor for moving shredded aluminum through said furnace and having a perforated floor for supporting the aluminum as it is moved sequentially through said first zone and then through said second zone;
    a first burner adapted to receive gases containing volatiles from said first zone and burning them to produce hot gas;
    a second burner adapted to receive gases from said second zone and burning them;
    a fan adapted to receive said hot gas from said first burner and cooler gas from said second burner to provide a recirculating gas stream;
    means for distributing said recirculating gas stream to said first and second zones and causing such gas to flow upwardly through the holes in the conveyor floor to contact scrap aluminum thereon;
    means for controlling the temperature in the furnace by controlling said burner and the temperature of the hot gas produced by the burner; and means for controlling the oxygen content of the gases in the furnace;

whereby the temperature in the furnace and the oxygen content of the gases can be controlled in relation to the speed and mass of the aluminum moved through the furnace to sufficiently vaporize the volatiles and pyrolyze the carbon on aluminum moved through the furnace while sufficiently minimizing oxidation of the aluminum.

10. Apparatus as set forth in claim 9 in which said furnace has an exhaust for gases near the downstream end of said second zone.

* * * * *